(12) United States Patent
Asper et al.

(10) Patent No.: US 7,655,896 B2
(45) Date of Patent: Feb. 2, 2010

(54) OPTICAL SENSOR, METHOD FOR PRODUCING AN OPTICAL SENSOR, AND METHOD FOR DETECTING AN OBJECT WITH AN OPTICAL SENSOR

(75) Inventors: Andres Asper, Wiesendangen (CH); Peter U. Halter, Frauenfeld (CH)

(73) Assignee: Baumer Electric AG, Frauenfeld (CH)

( * ) Notice: Subject to any disclaimer, the term of this patent is extended or adjusted under 35 U.S.C. 154(b) by 81 days.

(21) Appl. No.: 11/936,187

(22) Filed: Nov. 7, 2007

(65) Prior Publication Data

US 2008/0116359 A1 May 22, 2008

(51) Int. Cl.
*G06M 7/00* (2006.01)
(52) U.S. Cl. .................... 250/221; 250/216; 359/741
(58) Field of Classification Search ............. 250/221, 250/216; 359/741
See application file for complete search history.

(56) References Cited

U.S. PATENT DOCUMENTS

| 6,051,848 | A  | * | 4/2000 | Webb | 257/99 |
| 6,301,047 | B1 | * | 10/2001 | Hoshino et al. | 250/556 |
| 2007/0263296 | A1 | * | 11/2007 | Suzuki et al. | 359/710 |
| 2008/0117531 | A1 | * | 5/2008 | Asper et al. | 359/710 |

* cited by examiner

*Primary Examiner*—Seung C Sohn
(74) *Attorney, Agent, or Firm*—Volpe and Koenig, P.C.

(57) ABSTRACT

An optical sensor having a light source (3) and a structured front plate (11), which expands the focused light beam (9) of the light source (3) at least in one direction. In one advantageous construction, the structure includes an array with several cylindrical lenses (11). They are preferably constructed by hot stamping the surface the front plate (11). The expanded light beam (9) is suitable, in particular, for detecting narrow objects (1) or edges. The light source (3) and the front plate (11) are each aligned relative to the sensor housing (12).

13 Claims, 3 Drawing Sheets

OPTICAL SENSOR, METHOD FOR PRODUCING AN OPTICAL SENSOR, AND METHOD FOR DETECTING AN OBJECT WITH AN OPTICAL SENSOR

BACKGROUND

The invention is directed to an optical sensor, a method for producing an optical sensor, and also a method for detecting an object with an optical sensor.

Optical sensors for detecting objects can be constructed, for example, as diffuse-reflective sensors or as light barriers. They comprise a light source for transmitting visible or invisible light and a detector for receiving light, which is emitted by the light source. Light-emitting diodes, laser diodes, or IR diodes, for example, can be used as the light source. According to the construction of the sensor, the light source can be operated continuously or—for minimizing outside light influences—in a pulsed or clocked manner. It is also known to polarize the light and/or to focus the light using apertures and lenses or collimators to form a light beam.

As detectors, for example, phototransistors or photodiodes can be used. The light source and detector can be arranged, according to the purpose of the application and the function of the sensor, in a common housing or spatially separated from each other in separate housings.

For conventional diffuse-reflective sensors, the light emitted by the light source is usually focused by an aperture and a collimator lens to form a beam or a Gaussian beam with a nearly rotationally symmetric intensity distribution (relative to the propagation direction). Deviations from the rotational symmetry can be produced in LED light sources through their shape and in laser diodes based on the effects of refraction at their rectangular outlet opening. The focus or the narrow point of the light beam here determines the usable detection range. Conventionally, the beam diameter—this is defined by the converging of the beam diameter to the fraction 1/e radial to the beam direction—is usually kept as small as possible.

If this light beam strikes an object, it is at least partially reflected diffusely on its surface. A portion of the reflected light can be detected and evaluated by the detector. In other words: the light spot generated by the light beam on the object is imaged by the imaging optics arranged in front of the detector onto the light-sensitive surface of the detector.

Simple diffuse-reflective sensors merely evaluate the intensity of the captured light: the shorter the distance between the light source and measurement object, the higher the light intensity detected by the detector. By setting a switching threshold, a switching distance can be set for a certain type of measurement object.

Diffuse-reflective sensors with background masking and also distance sensors normally use the triangulation principle. In this way, the portion of light reflected by the object in the direction of the detector is imaged onto the detector and the position or location of the detected light on the detector is evaluated, with this position changing as a function of the distance between the sensor and object. The detector is constructed so that it can distinguish at least two different incident positions of the light reflected on a measurement object. As detectors, for example, two or more photodiodes or phototransistors, which are discrete components or which are integrated on a common substrate, can be used. Alternatively, detectors can also comprise one-dimensional or two-dimensional CCD arrays with high spatial resolution. By evaluating the difference in brightness on the individual pixels, the precise position of the main beam and from this the position of the detected object can be determined.

In conventional optical sensors, usually bulky, spherical glass or plastic lenses are used for influencing the light generated by a light source. These lenses are typically arranged between the generating light source and a front-side window that is transparent for the light of the light source, such that a focused light beam can be emitted with the smallest possible beam diameter. The lenses often require complicated alignment and/or holding devices and a lot of space. This is especially the case when several lenses are to be arranged one behind the other or one next to the other. The large space requirements set limits on the miniaturization of such sensors.

Conventional optical sensors are suitable not at all or only inadequately for detecting very thin or linear objects, such as, e.g., edges of films or other objects or even color marks, because such objects scatter only a small fraction of the light emitted by the light source so that the scattered light can be detected by the detector. The detection of lattice-like objects and objects with many small holes is also problematic with conventional sensors. In conventional sensors, the optics are tailored to a certain problem to be solved. Even slight changes to the initial conditions could make considerable adjustments necessary on the sensor housing, the holding device for the lens or lenses, and on the lenses themselves. In particular, the expense for aligning the light source, optics, and housing relative to each other is costly.

SUMMARY

Therefore, the objective of the present invention is to create an optical sensor that can be optimized in terms of different tasks and also a method for producing such a sensor. Another objective of the invention is to construct the sensor so that thin, linear objects can be detected reliably.

These objectives are met by an optical sensor, a method for producing an optical sensor, and also a method for detecting an object with an optical sensor according to the invention. Advantageous constructions are presented below and in the claims.

According to the invention, the optical sensor comprises a front plate with several optical elements for influencing the light beam. Optical elements can be constructed, e.g., as relief, grating, or index structures. In particular, lenses or structures acting like lenses belong to the optical elements, for example, a two-dimensional array made from spherical or aspherical lenses or a one-dimensional array of cylindrical lenses arranged in parallel one next to the other. Obviously, instead of refractive lenses, diffractive optical elements (DOEs) can also be used.

The term "optical element" comprises, in addition to cylindrical lenses or spherical lenses, also corresponding lens sections, like those used, e.g., in Fresnel lenses, or aperture or grating structures. Obviously, any combination of such elements on a front plate is also possible. The optical elements are preferably arranged on the inside of the front plate facing the light source. If the front plate forms the closure of the sensor housing, this closure includes, in this case, a smooth outer side. The risk of contamination and mechanical damage are therefore minimal. Alternatively, the front plate can also be arranged within the sensor housing, viewed in the direction of the light beam, in front of another front plate or protective plate closing the sensor housing. Alternatively, optical elements can also be constructed on the outer side of the front plate and/or on both sides on the front plate or integrated into the front plate. The front plate can be held or attached in a defined position and alignment on the sensor housing rigidly or detachable with a positive and/or non-positive connection. Because the light source is also held or attached on the sensor housing in a defined position, an alignment of the optical elements relative to the light source is not necessary. In addition, the front plate is generally a large element in comparison with the lenses used in the sensor. For this reason, in particular, an angle error becomes much smaller for the same lateral mounting tolerance. This is normally sufficient for eliminating alignment.

For an especially advantageous construction, several plano-concave cylindrical lenses directly in line with each other are constructed on the front plate. These can be arranged, e.g., by hot stamping on the inside of a plastic front plate or a glass front plate coated with plastic. They cause an expansion of the light beam in a direction orthogonal to the optical axis or beam axis and orthogonal to the cylindrical lens axes. Because the light beam overlaps several lenses or micro-lenses or passes through several lenses arranged one next to the other, such devices are insensitive to shifting of the front plate in the direction of the cylindrical lenses in line with each other. An analogous situation applies for the shifting of front plates with a matrix made from spherical or aspherical lenses in the plane defined by the front plate.

Front plates with hot-stamped lens arrays can be manufactured economically by stamping, e.g., a self-adhesive film with a plurality of such lens arrays, e.g., using a method that rotates and adheres it onto a transparent carrier plate made from glass or plastic. Then the carrier plate is sectioned into individual front plates. The hot-stamping method also has the advantage that the films or plates to be stamped can be protected against mechanical damage with a very thin and hard protective layer. This protective layer also remains after the hot stamping of the lenses. In comparison with later coating of the front plates, this method is significantly more economical. In addition, the optical properties caused by the hot stamping are not changed any more.

In addition to the optical elements, which cause, e.g., an expansion of the light beam in one or two directions orthogonal to the optical axis, other optical elements can be constructed on the front plate. In particular, structures of a Fresnel lens for focusing the light beam can be constructed on the side of the front plate opposite the lens array. Alternatively or additionally, other optical elements can be constructed to the side of the lens array. These can be used for imaging the light of the light source scattered on an object onto a detector arranged in the sensor housing.

The front plate with the optical elements can be relatively thin. As a light source, preferably a semiconductor laser with an aperture and a collimator lens is used. This arrangement delivers a coherent light beam with small beam diameter. If this light beam is incident on the cylindrical lens array, it is expanded by this array in one dimension, so that a linear emission spot is produced. If this linear emission spot is incident on a correspondingly aligned elongated object, it is reflected by this object and can be detected and evaluated by a detector with detection optics set in front. The usable signal that can be evaluated is clearly higher than for a point-shaped emission spot.

Therefore, because the optical elements are constructed directly on the front plate, the type and effect of the sensor can be adapted to different tasks just by using different front plates with or without optical elements. With the method according to the invention, the multitude of parts for manufacturing different sensors can be greatly reduced. As an alternative to hot stamping, front plates with optical elements can also be produced by other methods, e.g., as injection-molded parts or through casting resin to be hardened in corresponding shapes or through bonding structured films.

By homogenizing the emission beam, the depth of field or the usable detection region in the direction of the emission beam can be increased. This can be achieved by influencing one or more optical elements with at least two different focal distances. This can be achieved, for example, using a Fresnel lens constructed on the front plate, with the radii of curvature of the individual rings of this Fresnel lens corresponding alternately to the radii of curvature of two spherical or aspherical lenses with different focal lengths. This applies analogously also for cylindrical Fresnel lenses. Obviously, instead of a Fresnel lens, a bifocal lens could also be provided, in which the surface of ring-like structures with alternating radii of curvature includes two lenses with different focal lengths.

Alternatively or additionally, Fresnel lenses with different focal lengths could be constructed on both sides of the front plate. Instead of a single front plate, it is also possible to arrange several front plates with different optical elements relative to the emission beam one behind the other in or on the sensor housing. Likewise, it is possible to construct structures of a Fresnel lens on one of the surfaces of the collimator lens.

As an addition or alternative to the propagation direction, the emission beam can also be homogenized perpendicular to the propagation direction. In particular, for an expansion of the emission beam in one direction, it is advantageous in this direction to generate the most homogeneous energy distribution possible over the entire beam cross section. The energy distribution or the radiation strength thus has the most rectangular profile possible. Geometrically, this can be achieved optically with normal cylindrical lenses, or for higher aperture, with aspherical cylindrical lenses, that is, with lenses with a non-circular cross section. However, in reality, due to diffraction at the end edges of the profile, the energy distribution does not follow a rectangular profile. Minimums and maximums are produced with a very pronounced, excessive maximum at both ends of the profile. This can be significantly reduced and thus homogenized in a cylindrical lens array, e.g., by lenses with different focal lengths and/or with different widths of the cylindrical lenses or through specially adapted aspherical constants.

BRIEF DESCRIPTION OF THE DRAWINGS

The invention will be explained below in more detail with reference to a few figures. Shown are.

DETAILED DESCRIPTION OF THE PREFERRED EMBODIMENTS

Figure 1:
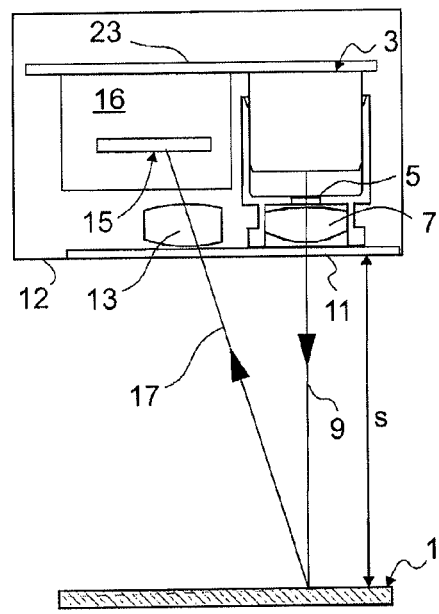
FIG. 1 a schematic representation of the layout of a diffuse-reflective sensor and the beam path for detecting an object, FIG. 2 a perspective view showing the effect of a flat front plate on the emission beam, FIG. 3 a perspective view of a structured front plate, FIG. 4 a cross section through a part of a front plate with a hot-stamped cylindrical lens array, FIG. 5 a view showing the effect of a front plate with an embossed cylindrical lens array aligned in a first direction to the emission beam, FIG. 6 a view showing the effect of a front plate with an embossed cylindrical lens array aligned in a second direction to the emission beam, FIG. 7 a view of a front plate with integrated cylindrical lens array and with Fresnel detection optics, FIG. 8a a view of a device with a light source and a lens or collimator lens for generating a light beam for a sensor according to the state of the art, FIG. 8b a view showing the expansion of a light beam using a cylindrical lens array constructed on the incident side of the light beam on a front plate, FIG. 8c a view showing the expansion of a light beam for an arrangement according to FIG. 8b, but with a cylindrical lens array arranged on the outlet side, FIG. 8d a view showing an arrangement according to FIG. 8b, but with additional Fresnel optics or diffractive optical elements on the outlet side of the front plate for increasing the depth of field, FIG. 8e a view showing the arrangement from FIG. 8d with an additional front or protective plate, FIG. 8f a view showing the construction of Fresnel optics for expanding the depth of field on the collimator lens, FIG. 8g a view showing the use of a bifocal lens for expanding the depth of field.
Figure 2:
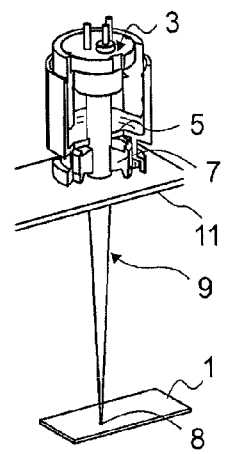

FIG. 1 shows schematically the layout of a diffuse-reflective sensor with a principle arrangement of the optical elements and the beam path for the detection of an object 1. A semiconductor laser diode is used as the light source 3. The light of the laser diode is focused by a collimator aperture 5 and a spherical or preferably aspherical lens or collimator lens 7 to form a narrow beam path or emission beam 9 (shown in FIG. 1 as an arrow). The light beam then emerges from the sensor housing 12 through a front plate 11 in the direction of the object 1 to be detected. Alternatively, the front plate 11 can also be constructed in the housing interior. In this case, another front plate 11 or a sealing or protective plate, which seals the sensor housing 12 on the front side (not shown), is provided in addition to the front plate 11. At least a portion of the light striking the surface of the object 1 is scattered diffusely on this object, so that it can be imaged by a detection lens 13 onto a detector 15. In FIG. 1, this is shown by a detection beam 17 in the shape of an arrow. For sensors working according to the triangulation principle, the position of the imaged light spot on the detector 15 is evaluated by detection or evaluation electronics 16 and an output signal corresponding to the relevant object distance s is generated. The detection electronics 16 with the detector 15 and the light source 3 are preferably arranged on a common circuit board 23 with defined relative position. FIG. 2 shows that the emission beam 9 in a sensor with a conventional smooth front plate 11 is focused by the collimator lens 7 to form a nearly point-shaped spot 8. The front plate 11 has practically no influence on the emission beam 9.

Figure 3:
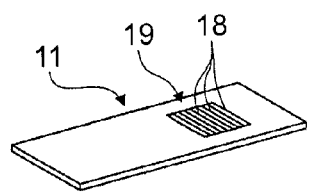

FIG. 3 shows an example construction of a rectangular front plate 11 with a square array made from 8 cylindrical lenses 18, which are encased by an unstructured frame 19.

Figure 4:
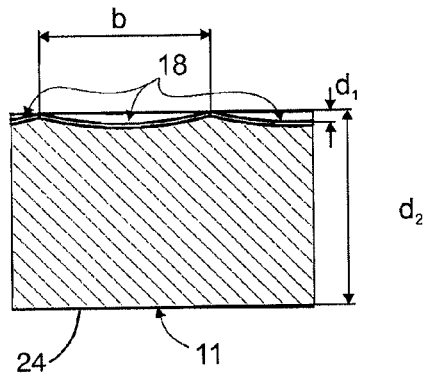

FIG. 4 shows a cross section of a front plate 11, in which structures of optical elements are constructed at least in the region of the transmission point of the emission beam 9 at the inside facing the light source 3. In the shown example, the optical elements comprise a cylindrical lens array with several plano-concave cylindrical lenses 18 aligned in parallel with each other and bordering each other directly. The depth $d_1$ of the embossing lies in the range of approximately 0.001 mm to approximately 0.3 mm, for example, at approximately 0.02 mm. The radius of curvature of the lenses can lie, e.g., in the range from approximately 0.1 mm to approximately 100 mm and can equal, e.g., approximately 6 mm. The width b of the individual cylindrical lenses 18 can lie, e.g., in the region of approximately 0.05 mm to approximately 2 mm. The width b of the structures or optical elements, which influence the light beam, is smaller than the diameter of the light beam, which can equal, e.g., approximately 2 mm to approximately 4 mm. The thickness $d_2$ of the front plate 11 made from, for example, red-colored acrylic glass, can be, e.g., less than approximately 2 mm and can equal, e.g., approximately 0.5 mm. Preferably, front plates 11 made from PMMA are used with a size or thickness of approximately 0.5 mm or approximately 1 mm. The optical elements can be produced, e.g., directly through hot stamping of these plates or through adhesion of a film with hot-stamped optical elements on these plates. Preferably, the material to be stamped includes a hard protective layer 24, which also offers protection against mechanical damage to the stamped structures after the stamping. For this reason, it can be applied economically to large-area plates, which are cut or punched to the desired format. Such protective layers are used, e.g., for coating eyeglass lenses. Obviously, for the parameters specified above, deviating or larger or smaller values are also possible. For front plates 11 with several lenses or lens arrays, the individual lenses can be constructed identically or with different characteristic parameters, e.g., lens widths, focal lengths, aspherical constants, and the like. As an alternative or addition to the cylindrical lenses 18, e.g., spherical lenses or structures of Fresnel lenses—especially cylindrical Fresnel lenses—or prisms can be constructed on the front plate 11 individually or in groups as one-dimensional or two-dimensional arrays. As an alternative or addition to the inside of the front plate 11 facing the light source 3, its outside can also be structured. The front plate 11 can include several layers, wherein at least one of the peripheral layers is preferably structured by hot stamping or under the effect of heat and pressure. Alternatively, a structure can also be formed on the front plate 11 in another way, for example, by producing the front plate 11 as an injection-molded part or by casting in a shape from a casting resin that is transparent for the light of the light source 3 or by adhering a structured film onto the smooth surface of the front plate 11. Diffractive optical elements (DOE) or aperture and/or grating structures can also be constructed on the front plate 11 as optical elements.

In another alternative construction, the sensor housing 12 is not sealed from the outside directly by the structured front plate 11, but instead by another front plate 11 or protective or sealing plate (not shown) mounted in front of the front plate 11. The front plate 11 is thus located within the sensor housing 12, which borders the outside world via the sealing plate.

The front plate 11 includes, external to the optical elements, a frame 19 or alternative attachment constructed for aligning and holding or fixing the front plate 11 on the sensor housing 12 or on other parts of the sensor. The front plate 11 can be adhered to the sensor housing 12, e.g., in the region of the frame 19 on a corresponding collar or can be fused by laser or ultrasound energy. It can be structured in a suitable way for aligning and/or for fusing in the region of the frame 19 and can include, e.g., one or more peripheral ribs, knobs, ridges, or grooves (not shown). Alternatively, boreholes (not shown) for screwing the front plate 11 tightly onto the sensor housing 12 can be constructed, e.g., in the frame 19. In another variant (not shown), the front plate 11 is fixed on the sensor housing by a clamping frame, preferably in a sealing manner. The receptacle on the sensor housing 12 and the front plate 11 are preferably aligned to each other so that the front plate 11 can be fixed on the sensor housing 12 with a positive fit or in a defined position. For the defined alignment, corresponding projecting or recessed structures on the sensor housing 12 and on the front plate 11 can also be used (not shown). If there is no sealing plate, the front plate 11 forms the front-side closure of a passage opening in the sensor housing 12.

Figure 5:
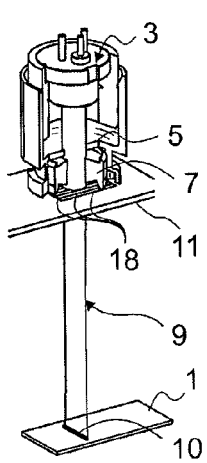
Figure 6:
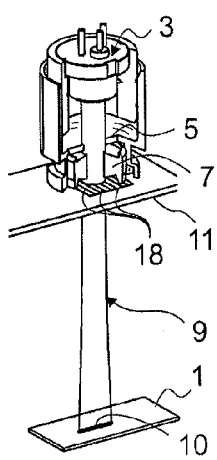
Figure 7:
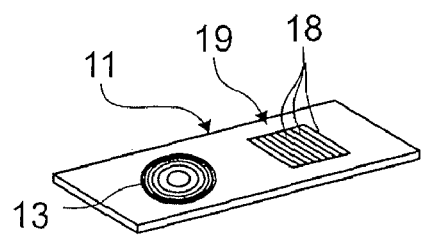

The optical elements on the front plate 11 are constructed for changing the geometry or the cross-sectional shape of the emission beam 9. With the cylindrical lens array shown in FIGS. 3 to 6, the emission beam 9 can be expanded in a direction perpendicular to the axes of the cylindrical lenses 18, so that a line 10 is produced on the surface of an object 1 in the focal area instead of a point-shaped spot 8. As can be seen from FIGS. 5 and 6, the emission beam 9 is expanded orthogonal to the direction of the axes of the cylindrical lenses 18. The line 10 is imaged onto the detector 15 by the detection lens 13. The detection lens 13 can be constructed, e.g., as a spherical, aspherical, or cylindrical focusing lens, which is held between the front plate 11 and the detector 15 on the sensor housing 12. Alternatively or additionally, optical elements for imaging the point-shaped or linear light spot formed by the emission beam 9 on the surface of the object 1 onto the detector 15 can also be constructed on the front plate 11. Such optical elements are included in the term "detection lens 13." FIG. 7 shows a front plate 11 with an integrated cylindrical lens array and with a Fresnel detection lens 13 arranged next to this array. By integrating the detection lens 13 into the front plate, the layout of the sensor can be further simplified and the structural size of the sensor can be further reduced.

The detection lens 13 is preferably constructed and arranged in the sensor housing 12, so that the light spot is imaged onto the light-sensitive detector element or elements as a function of the object distance s (FIG. 1) in a different manner. According to the construction of the detection lens 13, the light spot is imaged to scale or distorted onto the detector 15. In particular, for sensors with very small structural shapes, by the detection lens 13 in the front plate 11, the lens diameter can be increased for the same aperture. Therefore, the sensor has a larger receiving surface area and is more sensitive. A good solution in this respect is also a combination of a detection lens 13 with average focal length and another conventional lens (not shown) behind this lens 13 for reducing the effective focal length. Here, it can also be advantageous to divide the focusing lengthwise and perpendicular to the front plate 11, that is, for example, to perform the focusing perpendicular to the plate with a Fresnel cylindrical lens and the focusing lengthwise relative to the plate by a second lens behind the cylindrical lens. This second lens could be a conventional cylindrical lens 18, a Fresnel lens, a DOE, or even a normal spherical or aspherical lens. The expansion of the emission beam 9 in one or two dimensions has advantages in different situations:

For edges or narrow objects 1, which are illuminated with an emission beam 9 expanded in the direction of these edges, the signal level swing on the detector 15 can be significantly increased, so that very thin objects can also be detected reliably. Furthermore, the edge detection for slight edge roughness is greatly improved, because the expansion of the emission beam 9 along the edge leads to an averaging of the edge roughness.

For edges or narrow objects oriented perpendicular to the expansion direction of the emission beam 9, reliable object detection is possible not only at one position, but instead in the entire region of the expanded emission beam 9.

Analogously, for a planar or two-dimensional beam expansion, very small objects can also be detected reliably.

Figure 8A:
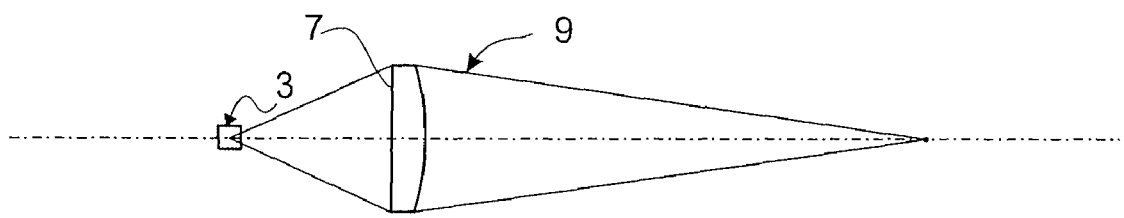
Figure 8B:
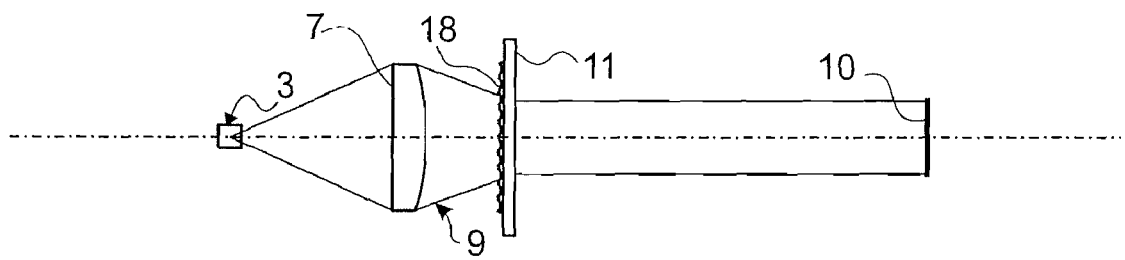
Figure 8C:
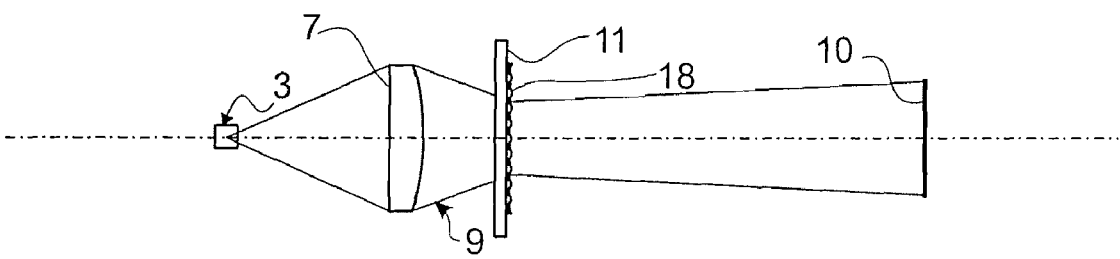

FIG. 8a shows schematically the affect according to the state of the art for the light emitted by the light source 3 through the collimator lens 7. In FIG. 8b, an array made from plano-concave cylindrical lenses 18 is inserted into the emission beam with cylindrical axes aligned orthogonal to the plane of the drawing, wherein the emission beam 9 is expanded orthogonal to the optical axis in the plane of the drawing. The cylindrical lens array is constructed on the incident side of the light of the light source 3. In the example of FIG. 8c, the cylindrical lens array is constructed on the outlet side of the light.

Figure 8D:
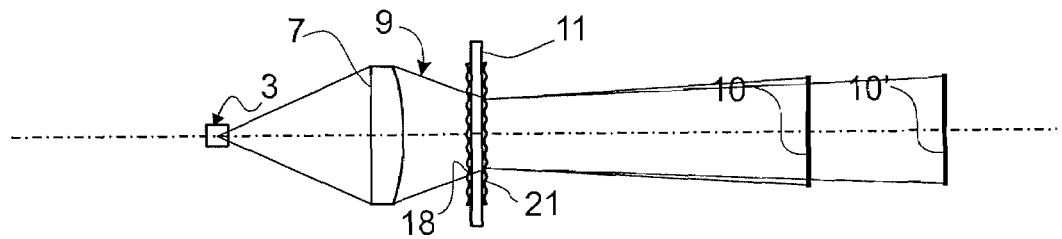

FIGS. 8d to 8g show possible arrangements, in which means for increasing the depth of field of the sensor or means for homogenizing the emission beam are provided. In the example of FIG. 8d, a cylindrical lens array or a cylindrical Fresnel lens or DOE is constructed on the inside of the front plate 11. On the opposing outer side, a Fresnel lens 21 is integrated into the front plate 11. This Fresnel lens 21 is a combination of two Fresnel lenses 21 with different focal lengths, with the adjoined ring elements alternately having the corresponding radii of curvature of one or the other Fresnel lens 21. On the surface of an object 1, which is located in one of the focal regions of the two combined Fresnel lenses 21, a sharp line 10 or line 10' is visible as a spot image. In this region, the laser beam has a lengthened narrow region of the beam. Elements of more than two Fresnel lenses 21 or several micro-lenses arranged one next to the other could also be used with different focal distances, in order to increase the depth of field.

Figure 8E:
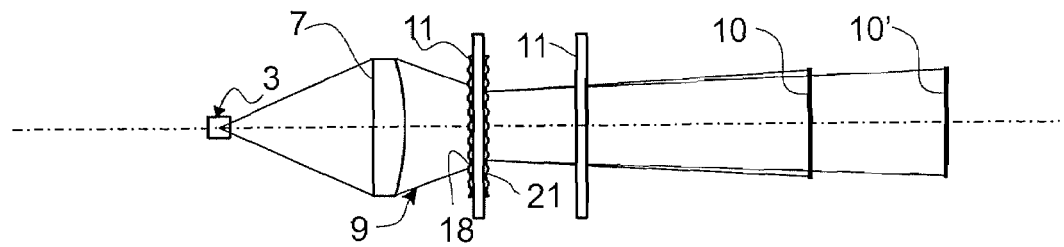
Figure 8F:
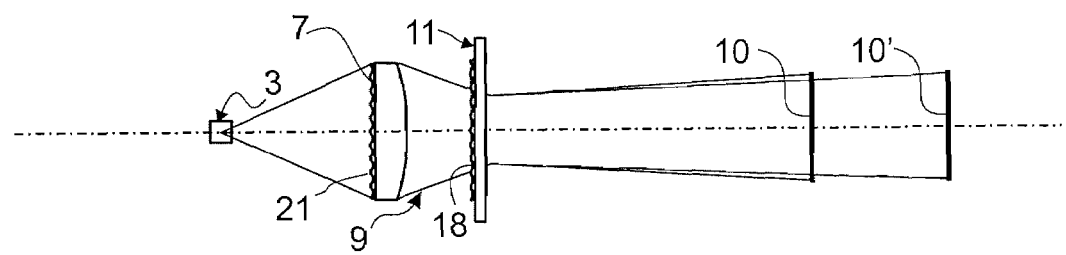
Figure 8G:
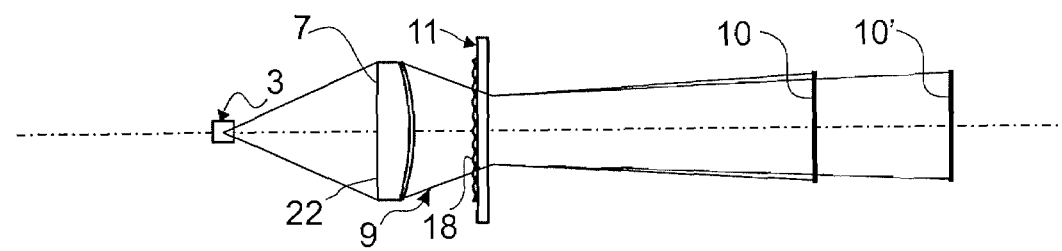

In FIG. 8e, another front plate 11 or protective plate is also provided. In FIG. 8f, a bifocal Fresnel lens 21 is constructed on one of the surfaces of the collimator lens 7. FIG. 8g shows an arrangement with a bifocal lens 22. Sections of several lenses with different focal distances could also be combined with each other to form a multi-focal lens.

In another construction, Fresnel lenses 21 and/or micro-lenses with different focal distances can be constructed on both sides of a front plate 11. As an alternative to lenses or lens sections, corresponding diffractive optical elements (DOE) could also be constructed on the front plate or plates 11.

Additionally or alternatively, in another construction of the invention, the light beam profile is homogenized. For example, twelve cylindrical lenses 18 each with a width b of 0.5 mm, a length of approximately 6 mm, and a radius of curvature of, for example, −2.2 mm can be constructed in line with each other on the front plate 11. With this array, at the focal distance of approximately 100 mm, a laser line 10 with a length of approximately 10 mm can be generated. Due to the effects of diffraction, excessive maximums are visible at the end points of the line 10.

These positions with excessive irradiation intensity could be reduced or blocked, e.g., through different construction of the cylindrical lenses 18 in line with each other. Here, cylindrical lenses 18 with two different focal lengths and/or different widths b (FIG. 4) are used alternately. The first of these focal lengths equals, for example, ca. 1 mm. The second focal length is approximately 14% to approximately 25% greater than or less than the first focal length. The difference factor can equal, for example, 1.17. In the present example, maximums of the irradiation intensity can be significantly reduced by alternating radii of curvature with values of approximately −2.2 mm and −1.88 mm, so that the laser beam exhibits a more uniform energy distribution. In an analogous way, alternating lenses can also be used with widths b of approximately 0.5 mm and a width b increased or reduced by approximately 14% to approximately 25%.

For homogenizing the light beam, alternatively twelve individual lenses with an aspherical profile can also be used. The radius and the aspherical constants are here selected so that the light beam is no longer equally homogenized along the beam spread geometrically and optically, but instead the energy distribution decreases towards the two outer edges. The radii of curvature are then approximately −2.4 mm and the aspherical constants equal for $y^4$: −0.5; $y^6$: 5; $y^8$: −20; $y^{20}$: −50.

The features according to the invention concerning the homogenization of the light beam and also the construction of optical elements on a front plate 11 can be used independent of each other or in connection with each other for optimizing an optical sensor. Cylindrical lenses 18 can also have a minimum curvature or convexity in the direction of the cylinder axes. Then they also have a slight lens effect with a focal length of, e.g., 100 mm perpendicular to the direction of beam spread.

The effect of a sensor can be determined in its production just through the selection of different front plates 11, with these front plates being able to be constructed with or without optical elements. In particular, it is possible to define different sensor properties, e.g., for test purposes or small batches just by adapting the front plate 11 with the optical elements.

For the evaluation of flat light areas in the detection 15, different methods, e.g., determining the focal point of the light distribution, time and/or spatial integration of the light on one or more sensor elements, forming the difference of the light intensity between different detector elements, and the like can be used.

Legend of the Reference Symbols

1 Object
3 Light source
5 Collimator aperture
7 Collimator lens
8 Spot
9 Emission beam
10 Line
12 Sensor housing
11 Front plate
13 Detection lens
15 Detector
17 Detection beam
18 Cylindrical lenses
19 Frame
21 Fresnel lens
22 Bifocal lens
23 Circuit board
24 Hard protective layer

The invention claimed is:

1. Optical sensor comprising a light source (3) arranged in a sensor housing (12) and a device for generating a light beam (9) with light from the light source (3), and a front plate (11) on the housing with several refractive or diffractive optical elements for influencing the light beam (9).

2. Optical sensor according to claim 1, wherein the optical elements are cylindrical lenses (18) or sections of one or more cylindrical lenses (18) in line with each other.

3. Optical sensor according to claim 2, wherein the optical elements are hot stamped on the front plate (11) or a coating of the front plate (11).

4. Optical sensor according to claim 3, wherein the front plate (11) comprises a hard protective layer for protection against mechanical damage.

5. Optical sensor according to claims 2, wherein the optical elements are constructed on a side of the front plate (11) facing the light source (3).

6. Optical sensor according to claim 1, further comprising detection electronics (16) with a detector (15) arranged in the sensor housing (12), and the front plate (11) comprises a detection lens (13) or additional optical elements, which are constructed for imaging light from the light source (3) scattered by an object (1) onto the detector (15).

7. Optical sensor according to claim 1, wherein the front plate (11) has a thickness $d_2$ of less than 2 mm.

8. Optical sensor according to claim 7, wherein the front plate (11) has a depth $d_1$ of the optical elements is less than 0.3 mm.

9. Optical sensor according to claim 1, wherein the front plate (11) has a depth $d_1$ of the optical elements is less than 0.3 mm.

10. Optical sensor according to claim 1, wherein a width b of the optical elements, which influence the light beam, is less than a diameter of the light beam.

11. Optical sensor according to claim 1, wherein the light source (3) and the front plate (11) are aligned on the sensor housing (12) such that they have a defined position relative to each other.

12. Method for producing an optical sensor, comprising:
hot stamping at least a portion of a surface of a front plate (11) or a film to be adhered onto the front plate (11) so that it is structured with several refractive or diffractive optical elements for influencing a light beam (9) of the optical sensor; and
aligning a light source (3) and the front plate (11) on a sensor housing (12) and rigidly or detachably connecting the light source and the front plate (11) to the housing, such that the light source (3) and the front plate (11) are aligned relative to each other.

13. Method for detecting an object (1) with an optical sensor, comprising:
emitting light from a light source (3) arranged in a sensor housing (12), focusing the light into a light beam (9), which is then emitted through a front plate (11), the light beam (9) is expanded in at least one direction by optical elements, which are constructed on the front plate (11) and whose structure width b is less than a diameter of the light beam (9), and is scattered by the object (1), and
imaging the light scattered by the object onto a detector (15).

* * * * *

UNITED STATES PATENT AND TRADEMARK OFFICE
CERTIFICATE OF CORRECTION

| | | |
|---|---|---|
| PATENT NO. | : 7,655,896 B2 | Page 1 of 1 |
| APPLICATION NO. | : 11/936187 | |
| DATED | : February 2, 2010 | |
| INVENTOR(S) | : Asper et al. | |

It is certified that error appears in the above-identified patent and that said Letters Patent is hereby corrected as shown below:

ON THE FACE PAGE

On the Title Page insert:

--(30) Foreign Application Priority Data

Swiss Priority Application No. 01846/06, filed November 16, 2006--.

Signed and Sealed this

Twenty-third Day of March, 2010

David J. Kappos
*Director of the United States Patent and Trademark Office*